United States Patent
Hwang et al.

(10) Patent No.: US 6,447,797 B2
(45) Date of Patent: *Sep. 10, 2002

(54) ANTIBACTERIAL PHOSPHOINOSITIDES

(75) Inventors: Shie-Ming Hwang, Columbus; Yung-Sheng Huang, Upper Arlington; Jim-Wen Liu, Dublin; Pradip Mukerji, Gahanna, all of OH (US); Steven Neal Anderson, Aurora; Jonathan A. Meulbroek, Lake Forest, both of IL (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/838,351

(22) Filed: Apr. 19, 2001

Related U.S. Application Data

(63) Continuation of application No. 09/035,602, filed on Mar. 5, 1998, now Pat. No. 6,258,375.

(51) Int. Cl.[7] .............................. A61K 9/20; A61K 9/22; A61K 9/28; A61K 9/16
(52) U.S. Cl. ........................ 424/439; 424/464; 424/468; 424/474; 424/475; 424/479; 424/481; 424/489; 424/490; 424/493; 424/496
(58) Field of Search ................................ 424/464, 468, 424/474, 475, 480, 482, 489, 490, 493, 496, 479, 481, 497, 495, 494, 439

(56) References Cited

U.S. PATENT DOCUMENTS

| | | | | |
|---|---|---|---|---|
| 4,897,384 A | * | 1/1990 | Janoff et al. | 514/34 |
| 6,020,506 A | * | 2/2000 | Aneja | 549/433 |
| 6,258,375 B1 | * | 7/2001 | Hwang et al. | 424/439 |

* cited by examiner

Primary Examiner—James M. Spear
(74) Attorney, Agent, or Firm—J. Michael Dixon

(57) ABSTRACT

It has been discovered that certain phosphoinositides demonstrate antibacterial activity. Particularly, these phosphoinositides have been discovered to prevent the adhesion of *H. influenzae* onto the nasopharyngeal cells of mammals, and, in particular, humans. Phosphoinositides useful with the present invention have the following formula:

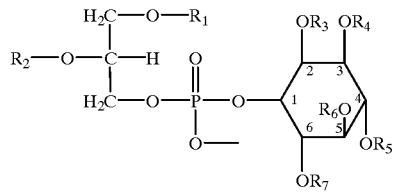

wherein $R_1$ and $R_2$ are selected from the group consisting of hydrogen and monounsaturated and saturated fatty acids having a carbon chain length of $C_6$ to $C_{20}$ and $R_1$ and $R_2$ can be the same or different; and $R_3$ to $R_7$ are selected from the group consisting of hydrogen or a phosphate moiety with at least two of $R_3$ to $R_7$ being a phosphate moiety; and hydrates and pharmaceutically acceptable salts thereof.

49 Claims, No Drawings

ANTIBACTERIAL PHOSPHOINOSITIDES

This application is a continuation of U.S. patent application Ser. No. 09/035,602, filed Mar. 5, 1998, which is now U.S. Pat. No. 6,258,375.

TECHNICAL FIELD

The present invention relates generally to phosphoinositides which have demonstrated antibacterial activity and particularly to phosphoinositides which can be used for the prophylaxis and treatment of bacterial infections and particularly for the prophylaxis and treatment of bacterial infections caused by *Haemophilus influenzae*.

BACKGROUND OF THE INVENTION

In the United States, otitis media, next to upper respiratory tract infections, is the most common cause for outpatient visits to pediatricians. Fifteen to twenty per cent of children younger than six years of age contract otitis media. Otitis media is an inflammation of the middle ear characterized by symptoms such as otalgia, hearing loss and fever. One of the primary causes of these symptoms is a build up of fluid (effusion) in the middle ear. Complications include permanent hearing loss, perforation of the tympanic membrane, acquired cholesteatoma, mastoiditis, and adhesive otitis. Children who develop otitis media in the first years of life are at risk for recurrent acute or chronic disease.

One of the primary causes of otitis media is *Haemophilus influenzae*, which is commonly known as "*H. influenzae*." It is thought that *H. influenzae* causes otitis media by adhering to nasopharyngeal cells. The adherence of *H. influenzae* to nasopharyngeal cells causes those cells to become infected and to produce secretions. The middle ear becomes infected because mechanical or functional obstruction of the Eustachian tube, which protects the middle ear from nasopharyngeal secretions, results in negative middle ear pressure. This negative pressure causes the nasopharyngeal secretions to enter the middle ear resulting in an infection, such as otitis media, usually with effusion.

Typically, otitis media is treated by means of administering a course of antibiotics consisting of a penicillin derivative. Other supportive therapies, such as analgesics, antipyretics and local heat are also helpful. Often, surgery is required to remove fluid from the middle ear and to relieve the pain experienced by the child.

Currently, no reliable prophylactic treatments are known. It has been demonstrated that human casein inhibits the adhesion of *H. influenzae* to human respiratory tract epithelial cells. See Aniansson, et. al., *Microbial Pathogenesis* 1990;8:315–323. Aniansson, et al., found that human casein represents a new mechanism for the protection by breast-milk against respiratory tract infection. Thus, it is thought that human casein may be effective as a prophylactic treatment for otitis media but further study is required.

Polyphosphoinositides have been reported to be present in inner ear and kidney tissue. See U.S. Pat. No. 4,897,384 to Janoff, et al. Phosphatidylinositol diphosphate has been postulated to serve as an in vivo receptor for aminoglycoside antibiotics. See Lodhi, et al., Biochem. Pharmacol. 29:597–601 (1990). Dipalmitoylphosphatidylinositol-3,4-diphosphate ammonium salt (PI-3,4-PP) is known to be a membrane lipid present in human erthyrocytes. However, no anti-bacterial activity of polyphosphoinositides has been previously reported.

For these reasons, a need still exists in the art for a composition and method for the prophylaxis and treatment of infections caused by *Haemophilus influenzae* and its clinical manifestations, such as, for example, otitis media.

SUMMARY OF THE INVENTION

It has been discovered that certain phosphoinositides demonstrate antibacterial activity. Particularly, these phosphoinositides have been discovered to prevent the adhesion of *H. influenzae* onto the nasopharyngeal cells of mammals, and, in particular, humans. Phosphoinositides useful with the present invention have the following formula (1):

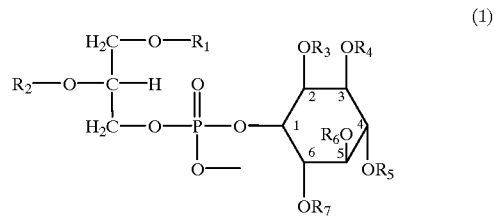

(1)

wherein $R_1$ and $R_2$ are selected from the group consisting of hydrogen and monounsaturated and saturated fatty acids having a carbon chain length of $C_6$ to $C_{20}$ and $R_2$ and $R_1$ can be the same or different; and $R_3$ to $R_7$ are selected from the group consisting of hydrogen or a phosphate moiety with at least two of $R_3$ to $R_7$ being a phosphate moiety; and hydrates and pharmaceutically acceptable salts thereof.

One aspect of the present invention is directed to a nutritional formulation for the prophylaxis and treatment of *Haemophilus influenzae* infection and its clinical manifestations comprising an effective amount of a compound of the formula (1). Another aspect of the present invention is directed to a pharmaceutical composition for the prophylaxis and treatment of *Haemophilus influenzae* infection and its clinical manifestations comprising an effective amount of a compound of the formula (1). Still another aspect of the present invention is directed to a method for the prophylaxis and treatment of bacterial infections comprising administering to a patient an effective amount of a compound of the formula (1). Yet another aspect of the present invention is directed to a method for the prophylaxis and treatment of otitis media comprising administering to a patient an effective amount of a compound of the formula (1).

In the above aspects of the invention, $R_1$ and $R_2$ are desirably both fatty acids; $R_1$ is desirably a fatty acid and $R_2$ is desirably hydrogen; or $R_1$ and $R_2$ are both desirably hydrogen.

If $R_1$ and $R_2$ are both fatty acids, then $R_3$, $R_6$ and $R_7$ are desirably hydrogen and at least one of $R_4$ and $R_5$ is desirably a phosphate moiety. More desirably, the compound is selected from the group consisting of diacylphosphatidylinositol-3-monophosphate, diacylphosphatidylinositol4-monophosphate and diacylphosphatidylinositol-3,4-diphosphate. Most desirably, the compound is dipalmitoylphosphatidylinositol-3,4-diphosphate.

If $R_1$ is a fatty acid and $R_2$ is hydrogen, then $R_3$, $R_6$ and $R_7$ are desirably hydrogen and at least one of $R_4$ and $R_5$ is desirably a phosphate moiety. More desirably, the compound is selected from the group consisting of 1-monoacylphosphatidylinositol-3-monophosphate, 1-monoacylphosphatidylinositol-4-monophosphate and 1-monoacylphosphatidylinositol-3,4-diphosphate.

If $R_1$ and $R_2$ are both hydrogen, then $R_3$, $R_6$ and $R_7$ are desirably hydrogen and at least one of $R_4$ and $R_5$ is a phosphate moiety. More desirably, the compound is selected from the group consisting of 3-phosphoglyceroinositol-3-monophosphate, 3-phosphoglyceroinositol4-monophosphate and 3-phosphoglyceroinositol-3,4-diphosphate.

Other objects and advantages of the invention will be apparent from the following detailed description and the appended claims.

DETAILED DESCRIPTION OF THE INVENTION

As stated above, it has been discovered that certain phosphoinositides demonstrate antibacterial activity. Particularly, these phosphoinositides have been discovered to prevent the adhesion of *H. influenzae* onto the nasopharyngeal cells of mammals, and, in particular, humans. Phosphoinositides useful with the present invention have the following formula (1):

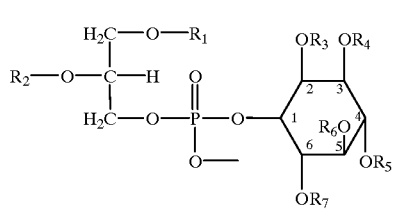

(1)

wherein $R_1$ and $R_2$ are selected from the group consisting of hydrogen and monounsaturated and saturated fatty acids having a carbon chain length of $C_6$ to $C_{20}$ and $R_3$ and $R_2$ can be the same or different; and $R_3$ to $R_7$ are selected from the group consisting of hydrogen or a phosphate moiety with at least two of $R_3$ to $R_7$ being a phosphate moiety; and hydrates and pharmaceutically acceptable salts thereof.

In the above compound, $R_1$ and $R_2$ are desirably both fatty acids; $R_1$ is desirably a fatty acid and $R_2$ is desirably hydrogen; or $R_1$ and $R_2$ are both desirably hydrogen.

If $R_1$ *and* $R_2$ are both fatty acids, then $R_3$, $R_6$ and $R_7$ are desirably hydrogen and at least one of $R_4$ and $R_5$ is desirably a phosphate moiety. More desirably, the compound is selected from the group consisting of diacylphosphatidylinositol-3-monophosphate, diacylphosphatidylinositol-4-monophosphate and diacylphosphatidylinositol-3,4-diphosphate. Most desirably, the compound is dipalmitoylphosphatidylinositol-3,4-diphosphate.

If $R_1$ is a fatty acid and $R_2$ is hydrogen, then $R_3$, $R_6$ and $R_7$ are desirably hydrogen and at least one of $R_4$ and $R_5$ is desirably a phosphate moiety. More desirably, the compound is selected from the group consisting of 1-monoacylphosphatidylinositol-3-monophosphate, 1-monoacylphosphatidylinositol-4-monophosphate and 1-monoacylphosphatidylinositol-3,4-diphosphate.

If $R_1$ and $R_2$ are both hydrogen, then $R_3$, $R_6$ and $R_7$ are desirably hydrogen and at least one of $R_4$ and $R_5$ is desirably a phosphate moiety. More desirably, the compound is selected from the group consisting of 3-phosphoglyceroinositol-3-monophosphate, 3-phosphoglyceroinositol-4-monophosphate and 3-phosphoglyceroinositol-3,4-diphosphate.

Most of the compounds which are useful with this invention are commercially available from Matreya, Inc. of Pleasant Gap, Pa. Other compounds of this invention can be formed by linking together two commercially available precursors. Particularly, most of the useful compounds can be synthesized by linking 3-phosphoglycerol with phytate and then subsequently modifying the resulting chemical structure to produce the desired compound. For example, the glycerol portion of the chemical structure can be esterified to appropriate fatty acids. As another example, the phytate portion of the chemical structure can be partially dephosphorylated to remove the desired number of phosphate groups from that portion of the chemical structure, Both 3-phosphoglycerol and phytate are commercially available from Matreya, Inc.

Phosphatidylinositol-3,4-diphosphate can also be synthesized by phosphorylating phosphatidylinositol or phosphatidylinositol-4-phosphate at the 3 position on the inositol ring with phosphatidylinositol-3-kinase. Phosphatidylinositol-3,4-diphosphate may also be produced by phosphorylation at the 4 position on the inositol ring of phophatidylinositol-3-phosphate with phosphatidylinositol-4-kinase.

EXAMPLE 1

Bioactivity of Polyphosphoinositides

To determine the ability of various phosphoinositides to prevent the adhesion of *Haemophilus influenzae* to human nasopharynx cells, the following procedure was used. Detroit 562 human pharynx carcinoma cells (DT 562) were obtained from the American Culture Type Collection. A *Haemophilus influenzae* nontypeable bacterium strain, which was isolated from the middle ear of an infected child, was obtained from Dr. Lauren Bakaletz of The Ohio State University in Columbus, Ohio.

The DT 562 cells were seeded into Costar 96 well plates at a density of 20,000 to 25,000 cells per well and were cultured in Dulbeco's modified Eagle Medium, available from Grand Island Biological Company. The cells were supplemented with 10% fetal bovine serum (FBS), available from Hyclone. The plates were incubated in a humidified atmosphere of 95% air and 5% carbon dioxide at 37° C. Plates containing cells were washed three times with 20 μL of Hanks Balanced Saline Solution (HBSS), available from Sigma Chemical Company of St. Louis, Mo., to remove serum proteins before the addition of bacteria in adhesion assays.

*Haemophilus influenzae* was streaked onto Chocolate agar plates, available from Becto Dickinson Diagnostic Instrument System of Sparks, Maryland, from frozen aliquots of a low passage number. The plates were then incubated at 37° C. in a humidified atmosphere of 95% air and 5% carbon dioxide for 18 hours to obtain logarithmically growing cultures. Bacteria harvested in phosphate buffered solution (PBS) supplemented with 0.05% bovine serum albumin (BSA), available from Miles Inc. of Kankakee, Ill., were centrifuged and resuspended in a volume of PBS/BSA yielding an optical density of 2.4 at a wavelength of 660 nm. [111]-Indium-oxine ([111]-In), a high-energy, short-lived tracer was utilized to radiolabel the bacteria. Fifty μCi of [111]-In solution was added to 2.5 mL of the bacterial suspension and incubated for 20 minutes at 37° C. The radiolabeled bacteria were then washed two times with 10 mL HBSS to remove unbound [111]-In and resuspended in 5 mL HBSS supplemented with 30 mM 2-hydroxyethylpiperazine-N'-2-ethane sulfonic acid buffer, available from Life Technologies, a producer of Gibco BRL Products, of Grand Island, N.Y. Twenty-five μL of the [111]-In labeled bacterial suspension was preincubated with 25 μL of the test chemical in a polypropylene 96 well plate, available from Costar, for 15 minutes at 37° C. to allow binding of the test agent to the *Haemophilus influenzae* bacterium.

To determine the adhesion quantitation, the following procedure was used. Twenty-five μL of the preincubation mixture containing radiolabeled bacteria and the test chemical were pipetted into each well of the assay plate containing DT 562 cells. The assay plate was incubated for about 15 to about 20 minutes at 37° C. to allow adhesion of the bacteria to the cell monolayer. Nonadherent bacteria were removed by washing the plate three times in HBSS. The assay was terminated by the addition of 100 μL of 0.05 N sodium hydroxide to disrupt the cell monolayer and the adhering of the *Haemophilus influenzae* bacterium. The contents of each well were then placed in Cobra polypropylene tubes and counted on a Cobra Gamma Counter, available from Packard Bell. After background radiation was subtracted from each well, the average count of four replicates (per sample) was calculated. Results are presented in Table 1 as the percent of inhibition of bacterial adhesion, as compared to bacterial attachment, in control wells containing no test chemical and in which the percent of inhibition is zero.

Several compounds encompassing five classes related to phosphoinositides were selected and subjected to bioassay. These compounds were the following: 1-D-myo-inositol-1,2,6-triphosphate sodium salt (I-1,2,6-PPP); 1-D-myo-inositol-1,3,4-triphosphate sodium salt (I-1,3,4-PPP); 1-(a-glycerophosphopoyl)-D-myo-insoitol lithium salt (GPI); L-a-phosphatidylinositol ammonium salt (PI); dipalmitoylphosphatidylinositol-3-phosphate ammonium salt (PI-3-P); L-a-phosphatidylinositol-4-monophosphate sodium salt (PI-4-P); and dipalmitoylphosphatidylinositol-3,4-diphosphate ammonium salt (PI-3,4-PP). One compound, PI-3,4-PP was found to be especially active and exhibited a dose response. The PI-3,4-PP at a level of 0.1 mg/mL inhibited the adhesion of *H. influenzae* to human pharynx cells by from about 74% to about 81%. At 0.050 mg/mL, PI-3,4-P inhibited about 80% of the adhesion of the *H. influenzae*. The PI-3,4-PP exhibited activity at a concentration as low as 0.006 mg/mL. Two compounds, PI-3-P and PI-4-P, showed a lower level of activity. The inhibition was 24% at a level of 0.1 mg/mL. The remaining four compounds, I-1,2,6-PPP, I-1,3,4-PPP, GPI and PI were inactive. The results are shown in Table 1.

TABLE 1

Bioactivities of Phosphoinositides

| Compound | % Inhibition | Test Level |
|---|---|---|
| I-1,2,6-PPP | 6* | 0.1 mg/mL |
| I-1,3,4-PPP | −1 | 0.1 mg/mL |
| GPI | −3 | 0.5 mg/mL |
| PI | −2 | 0.1 mg/mL |
| PI-3-P | 24 | 0.1 mg/mL |
| PI-4-P | 24 | 0.1 mg/mL |
| PI-3,4-PP | 74 | 0.1 mg/mL |
| PI-3,4-PP | 81 | 0.100 mg/mL |
| PI-3,4-PP | 80 | 0.050 mg/mL |
| PI-3,4-PP | 58 | 0.025 mg/mL |
| PI-3,4-PP | 33 | 0.013 mg/mL |
| PI-3,4-PP | 31 | 0.006 mg/mL |

*Within statistical error; thus no activity is presumed.

EXAMPLE 2

IN vivo Activity of PI-3,4-PP

The attachment of *Haemophilus influenzae* to a mammal's nasopharynx area is believed to be the first stage of a bacterial infection which can lead to otitis media and other disorders and diseases caused by *Haemophilus influenzae*. A neonatal rat model was used to test the in vivo activity of phosphoinositides, and more specifically PI-3,4-PP, against nontypeable *Haemophilus influenzae*. The results show that PI-3,4-PP can inhibit the attachment and, thus, growth of nontypeable *Haemophilus influenzae* in the nasopharynx of neonatal rats, as shown in Table 2.

TABLE 2

In vivo Activity of PI-3,4-PP Against *H. influenzae*

| Treatment | Trial | Inoculum Dose CFU/Pup | H.I. Recovered $Log_{10}$ (CFU/mL) |
|---|---|---|---|
| HI + HBSS | 1 | 100 | 3.25 ± 0.59 |
| HI + PI-3,4-PP | 1 | 53 | 1.34 ± 0.58 |
| HBSS | 1 | 0 | 1.72 ± 0.87 |
| HI + HBSS | 2 | 720 | 3.13 ± 0.75 |
| HI + PI-3,4-PP | 2 | 630 | 2.54 ± 1.08 |
| HBSS | 2 | 0 | 1.24 ± 0.58 |

HI = nontypeable *Haemophilus influenzae*
HBSS = Hank's Balanced Saline Solution
Inoculum Dose was individually determined for each inoculum.

In the test, overnight cultures of nontypeable *Haemophilus influenzae* were prepared, washed twice and diluted with HBSS to obtain a bacterial suspension of less than 100,000 colony forming units (CFU) per mL. Sample solutions of the PI-3,4-PP were prepared by dissolving in HBSS at 2 mg/mL. The sample solution was mixed with an equal volume (0.5 mL) of the diluted bacterial suspension and incubated for one hour at 37° C. A bacterial control was prepared by mixing and incubating 0.5 mL HBSS with an equal volume of the diluted bacterial suspension. A solvent blank was prepared by incubating 1 mL of HBSS under the same conditions.

In the test, the experimental and control mixtures were used to inoculate 24-hour-old or younger rat pups at 10 μL each intranasally. Twenty-four hours after administration, samples of nasopharyngeal fluid were obtained by the slow instillation of 25 μL of HBSS into the left naris and the initial 10 μL discharge from the right naris was collected for plate count. This procedure insured that the fluid had passed through the nasopharynx. The nasal wash was then spread, or diluted and then spread, onto chocolate agar plates. The plates were incubated at 37° C. overnight and counted for the number of CFU's, an indicator of the number of viable bacteria.

Table 2 shows the average inoculum dose in CFU and the average *Haemophilus influenzae* recovered in $log_{10}$(CFU/mL) per rat pup for each group, 10 rat pups per group. The results showed that PI-3,4-PP is not bactericidal but rather that the PI-3,4-PP inhibits the attachment of nontypeable *Haemophilus influenzae* to nasopharyngeal cells of neonatal rats and thus preventing the replication of the bacteria in the animal.

In trial 1, the treated group (HI+PI-3,4-PP) showed an 80 fold (1.9 logs) reduction in the number of bacteria recovered 24 hours post-inoculation as compared to the untreated groups (HI+HBSS) at an inoculum dose of 53–100 CFU/pup. In trial 2, the treated group, at the same 1 mg/mL PI-3,4-PP concentration, showed a smaller, fold (0.6 log) reduction in the number of bacteria recovered as compared to the untreated group when the inoculum dose was 630–720 CFU/pup. This showed a trend of inoculum dose response of PI-3,4-PP against the nontypeable *Haemophilus influenzae*.

The phosphoinositides of the present invention are desirably used to formulate pharmaceutical compositions and nutritional compositions which can be administered to patients for the prophylaxis and treatment of otitis media and bacterial infections, particularly, bacterial infections caused by *Haemophilus influenzae*. An effective dose can be readily determined by the use of conventional techniques and by observing results obtained under analogous circumstances. In determining the effective dose, a number of factors are considered including, but not limited to, the following: the species of the patient; its size, age and general health; the specific illness involved; the severity of the illness; the response of the individual patient; the mode of administration; the bioavailability characteristics of the preparation administered; the dose regimen selected; and the use of concomitant medication. Typically, the compositions would be formulated to deliver a dose of from about 4 milligrams to about 24 milligrams of the phosphoinositide. Higher dosages can be used. Dosage rates are from about 3 to about 6 times per day, although fewer or more doses may be administered as necessary.

In effecting treatment of a patient, the compound of formula (1) is administered in any form or mode which makes the compound bioavailable in effective amounts, including oral and parenteral routes. For example, the compound can be administered orally, subcutaneously, intramuscularly, intravenously, transdermally, intra nasally, rectally and the like. Oral administration is generally desirable. One skilled in the art of preparing formulations can readily select the proper form and mode of administration depending on the disease state to be treated, the stage of the disease and other relevant circumstances.

The compounds of formula (1) can be administered in the form of pharmaceutical compositions or medicaments which are made by combining the compounds of formula (1) with pharmaceutically acceptable carriers or excipients, the proportion and nature of which are determined by the chosen route of administration, and standard pharmaceutical practice.

The pharmaceutical compositions comprise an effective amount of the compound of formula (1) and pharmaceutically acceptable carriers and excipients, the proportion and nature of which are determined by the chosen route of administration, and standard pharmaceutical practice. The carrier or excipient may be a solid, semi-solid or liquid material which can serve as a vehicle or medium for the active ingredient. Suitable carriers and excipients are known in the art. The pharmaceutical composition may be adapted for oral or parenteral use and may be administered to the patient in the form of tablets, capsules, solution, suspensions or the like.

In one aspect of the present invention, the compound of formula (1) is mixed with a carrier and formed into a tablet, capsule or pill. The tablet may optionally be coated with a polymeric material which changes the dissolution rate of the tablet to sustain the release of the active component in the oral mucosa. In another embodiment, the compound can be mixed with a carrier and formed into mulb-unit dosage granules. These granules can then be coated with a polymeric material which changes the dissolution rate of the granules to sustain the release of the active component in the oral mucosa. Useful carriers include, but are not limited to, lactose, sorbitol, starch, and gelatin. In still another aspect of the present invention, the compound can be formulated into a liquid preparation. In still another aspect, the compound can be formulated into a nasal spray. In yet another aspect of the present invention, the compound of formula (1) can be formulated into a liquid pharmaceutical preparation using, for example, glycerol, propylene glycol or other appropriate carriers for liquid preparations. The pharmaceutical compositions of this invention can also be formulated to include at least one nutrient selected from the group consisting of vitamins, minerals, carbohydrates, sugars, amino acids, proteinaceous materials, fatty acids, phospholipids, antioxidants and phenolic compounds. The method of manufacture and useful materials for these embodiments are within the skill of a person skilled in the art and will not be discussed here.

The tablets, pills, capsules, or granules and the like may also contain one or more of the following adjuvants: binders, such as microcrystalline cellulose, gum tragacanth or gelatin: excipients, such as starch or lactose, disintegrating agents such as alginic acid, Primogel, corn starch and the like; lubricants, such as magnesium stearate or Sterotex; glidants, such as colloidal silicon dioxide; sweetening agents, such as sucrose or saccharin; and flavoring agents, such as peppermint or orange flavoring. Other dosage unit forms may contain other various materials which modify the physical form of the dosage unit, for example coatings. Tablets or pills may be coated with sugar, shellac or other enteric coating agents. The liquid preparation may contain, in addition to the active ingredient, sucrose as a sweetening agent and certain preservatives, dyes, colorings and flavoring agents.

Materials used in preparing these various compositions should be pharmaceutically pure and non-toxic in the amounts used.

The nutritional formulation of the present invention can also be used for the prophylaxis and treatment of bacterial infections and, particularly, bacterial infections caused by *Haemophilus influenzae*. The nutritional formulation can be formulated to include one or more nutrient selected from the group consisting of vitamins, minerals, carbohydrates, sugars, amino acids, proteinaceous materials, fatty acids, phospholipids, antioxidants and phenolic compounds. The nutritional formulation may also include adjuvants, such as those listed above.

Another aspect of the present invention is also directed to a method for the prophylaxis and treatment of bacterial and/or *Haemophilus influenzae* infections comprising administering to a patient an effective amount of a compound of formula (1) or its derivatives. The compound of formula (1) can be delivered in combination with at least one nutrient selected from the group consisting of vitamins, minerals, carbohydrates, sugars, amino acids, proteinaceous materials, fatty acids, phospholipids, antioxidants and phenolic compounds. Useful dosages and modes of delivery are described above.

Still another aspect of the present invention provides a method for the prophylaxis and treatment of otitis media comprising administering to a patient an effective amount of a compound of formula (1) or its derivatives. The compound of formula (1) or its derivatives can be delivered in combination with at least one nutrient selected from the group consisting of vitamins, minerals, carbohydrates, sugars, amino acids, proteinaceous materials, fatty acids, phospholipids, antioxidants and phenolic compounds. Useful dosages and modes of delivery are described above.

As used herein, the term "patient" refers to warm-blooded animals or mammals, including, but not limited to, mice, rats and humans. A patient is in need of treatment for a bacterial infection and/or *Haemophilus influenzae* infection when the patent is suffering from fever, otalgia, and hearing loss. A patient is in need of treatment for otitis media when the patient is suffering from symptoms, such as, for example, fever, otalgia, or hearing loss.

The identification of patients who are in need of treatment for a bacterial infection, a *Haemophilus influenzae* infection or otitis media is well within the ability and knowledge of a skilled practitioner. A practitioner skilled in the art can readily identify, by the use of clinical tests, physical examination and medical/family history, those patients in need of treatment for a *Haemophilus influenzae* infection or otitis media. Successful treatment is also understood to include prophylaxis in treating a patent in those instances in which the patient has experienced a prior bacterial infection, *Haemophilus influenzae* infection or otitis media occurrence and also in those instances when a patient has been deemed by a skilled practitioner to be a likely candidate for either a bacterial infection, a *Haemophilus influenzae* infection or otitis media.

Industrial Applicability

The present invention is useful for the prophylaxis and treatment of otitis media, *H. influenzae* infections or bacterial infections. The phosphoinositides useful with the present invention are readily available from aquatic plants, such as duckweed and Commelina spp., and possibly carrots and corn. Further, useful phosphoinositides are easily synthesized in the laboratory or prepared from animal tissues or plants. Thus, the present invention provides an effective and inexpensive mode of preventing and treating *H. influenzae* and bacterial infections and for preventing and treating otitis media.

The embodiments of the present invention may, of course, be carried out in other specific ways than those set forth herein without departing from the spirit and scope of the invention. The present embodiments are, therefore, to be considered in all respects as illustrative and not restrictive and that all changes and equivalents also come within the description of the present invention.

We claim:

1. A nutritional formulation for the treatment of *Haemophilus influenzas* infection and its clinical manifestations comprising:
   a) an effective amount of a compound of the formula (1):

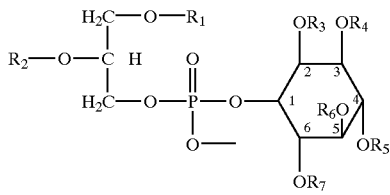

(1)

wherein $R_2$ and $R_1$ are selected from the group consisting of hydrogen and monounsaturated and saturated fatty acids having a carbon chain length of $C_6$ to $C_{20}$ and $R_1$ and $R_2$ can be the same or different; and $R_3$ to $R_7$ are selected from the group consisting of hydrogen or a phosphate moiety with at least two of $R_3$ to $R_7$ being a phosphate moiety; and hydrates and pharmaceutically acceptable salts thereof, and;
   b) one or more nutrients selected from the group consisting of vitamins, mineral, carbohydrates, sugars, amino acids, proteinaceous materials, fatty acids, phospholipids, antioxidants, and phenolic compounds.

2. The nutritional formulation of claim 1 wherein $R_1$ and $R_2$ are fatty acids.

3. The nutritional formulation of claim 1 wherein $R_1$ is a fatty acid and $R_2$ is hydrogen.

4. The nutritional formulation of claim 1 wherein $R_1$ and $R_2$ are hydrogen.

5. The nutritional formulation of claim 2 wherein $R_3$, $R_6$ and $R_7$ are hydrogen and at least one of $R_4$ and $R_5$ is a phosphate moiety.

6. The nutritional formulation of claim 5 wherein said compound is selected from the group consisting of diacylphosphatidylinositol-3-monophosphate, diacylphosphatidylinositol-4-monophosphate and diacylphosphatidylinositol-3,4-diphosphate.

7. The nutritional formulation of claim 6 wherein the compound is dipalmitoylphosphatidylinositol-3,4-diphosphate.

8. The nutritional formulation of claim 3 wherein $R_3$, $R_6$ and $R_7$ are hydrogen and at least one of $R_4$ and $R_5$ is a phosphate moiety.

9. The nutritional formulation of claim 8 wherein said compound is selected from the group consisting of 1-monoacylphosphatidylinositol-3-monophosphate, 1-monoacylphosphatidylinositol4-monophosphate and 1-monoacylphosphatidylinositol-3,4-diphosphate.

10. The nutritional formulation of claim 4 wherein $R_3$, $R_6$ and $R_7$ are hydrogen and at least one of $R_4$ and $R_5$ is a phosphate moiety.

11. The nutritional formulation of claim 10 wherein said compound is selected from the group consisting of 3-phosphoglyceroinositol-3-monophosphate, 3-phosphoglyceroinositol-4-monophosphate and 3-phosphoglyceroinositol-3,4-diphosphate.

12. A method for the treatment of otitis media comprising orally administering to a patient an effective amount of a compound of the formula (1):

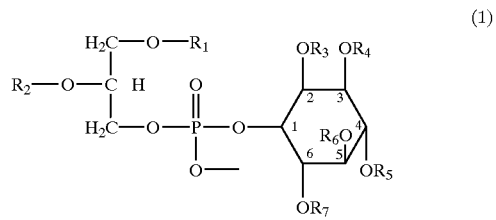

(1)

wherein $R_1$ and $R_2$ are selected from the group consisting of hydrogen and monounsaturated and saturated fatty acids having a carbon chain length of $C_6$ to $C_{20}$ and $R_1$ and $R_2$ can be the same or different; and $R_3$ to $R_7$ are selected from the group consisting of hydrogen or a phosphate moiety with at least two of $R_3$ to $R_7$ being a phosphate moiety; and hydrates and pharmaceutically acceptable salts thereof; in which said compound is in admixture with a pharmaceutically acceptable carrier, a nutrient, or an admixture thereof.

13. A pharmaceutical composition for the treatment of *Haemophilus influenza* infection and its clinical manifestations comprising:
   a) an effective amount of a compound of the formula (1):

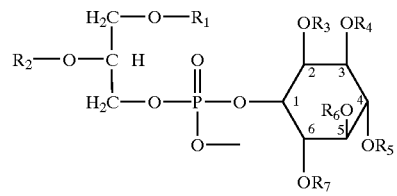

wherein $R_1$ and $R_2$ are selected from the group consisting of hydrogen and monounsaturated and saturated fatty acids having a carbon chain length of $C_6$ to $C_{20}$ and $R_1$ and $R_2$ can be the same or different and $R_3$ to $R_7$ are selected foam the group consisting of hydrogen or a phosphate moiety with at least two of $R_3$ to $R_7$ being a phosphate moiety; and hydrates and pharmaceutically acceptable salts thereof, and;
   b) said compound is in admixture with a pharmaceutically acceptable carrier suitable for oral administration.

14. The pharmaceutical composition of claim 13 wherein $R_1$ and $R_2$ are fatty acids.

15. The pharmaceutical composition of claim 13 wherein $R_1$ is a fatty acid and $R_2$ is hydrogen.

16. The pharmaceutical composition of claim 13 wherein $R_1$ and $R_2$ are hydrogen.

17. The pharmaceutical composition of claim 14 wherein $R_3$, $R_6$ and $R_7$ are hydrogen and at least one of $R_4$ and $R_5$ is a phosphate moiety.

18. The pharmaceutical composition of claim 17 wherein said compound is selected from the group consisting of diacylphosphatidylinositol-3-monophosphate, diacylphosphatidylinositol-4-monophosphate and diacylphosphatidylinositol-3,4-diphosphate.

19. The pharmaceutical composition of claim 18 wherein said compound is dipalmitoylphosphatidylinositol-3,4-diphosphate.

20. The pharmaceutical composition of claim 15 wherein $R_3$, $R_6$ and $R_7$ are hydrogen and at least one of $R_4$ and $R_5$ is a phosphate moiety.

21. The pharmaceutical composition of claim 15 wherein said compound is selected from the group consisting of 1-monoacylphosphatidylinositol-3-monophosphate, 1-monoacylphosphatidylinositol-4-monophosphate and 1-monoacylphosphatidylinositol-3,4-diphosphate.

22. The pharmaceutical composition of claim 16 wherein $R_3$, $R_6$ and $R_7$ are hydrogen and at least one of $R_4$ and $R_5$ is a phosphate moiety.

23. The pharmaceutical composition of claim 22 wherein said compound is selected from the group consisting of 3-phosphoglyceroinositol-3-monophosphate, 3-phosphoglyceroinositol4-monophosphate and 3-phosphoglyceroinositol-3,4-diphosphate.

24. The pharmaceutical composition of claim 13 wherein said compound is mixed with a pharmaceutically acceptable carrier and is formed into a tablet.

25. The pharmaceutical composition of claim 13 wherein said tablet is coated with a polymeric material which changes the dissolution rate of the tablet to sustain the release of the active component in the oral mucosa.

26. The pharmaceutical composition of claim 13 wherein said compound is mixed with a carrier and formed into multi-unit dosage granules.

27. The pharmaceutical composition of claim 13 wherein said granules are coated with a polymeric material which changes the dissolution rate of the tablet to sustain the release of the phosphatidylinositol diphosphate in the oral mucosa.

28. The pharmaceutical composition of claim 13 wherein said compound is formulated into a liquid preparation.

29. A method for the treatment of bacterial infections comprising orally administering to a patient an effective amount of a compound of the formula (1):

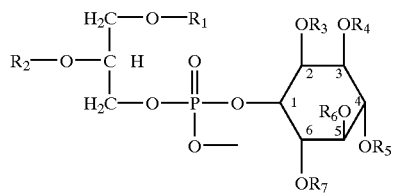

(1)

wherein $R_1$ and $R_2$ are selected from the group consisting of hydrogen and monosaturated and saturated fatty acids having a carbon chain length of $C_6$ to $C_{20}$ and $R_1$ and $R_2$ can be the same or different; and $R_3$ to $R_7$ are selected from the group consisting of hydrogen or a phosphate moiety with at least two of $R_3$ to $R_7$ being a phosphate moiety; and hydrates and pharmaceutically acceptable salts thereof; in which sold compound is in admixture with a pharmaceutically acceptable carrier, a nutrient, or an admixture thereof.

30. The method of claim 29 wherein $R_1$ and $R_2$ are fatty acids.

31. The method of claim 29 wherein $R_1$ is a fatty acid and $R_2$ is hydrogen.

32. The method of claim 29 wherein $R_1$ and $R_2$ are hydrogen.

33. The method of claim 30 wherein $R_3$, $R_6$ and $R_7$ are hydrogen and at least one of $R_4$ and $R_5$ is a phosphate moiety.

34. The method of claim 33 wherein said compound is selected from the group consisting of diacylphosphatidylinositol-3-monophosphate, diacylphosphatidylinositol-4-monophosphate and diacylphosphatidylinositol-3,4-diphosphate.

35. The method of claim 34 wherein said compound is dipalmitoylphosphatidylinositol-3,4-diphosphate.

36. The method of claim 31 wherein $R_3$, $R_6$ and $R_7$ are hydrogen and at least one of $R_4$ and $R_5$ is a phosphate moiety.

37. The method of claim 36 wherein said compound is selected from the group consisting of 1-monoacylphosphatidylinositol-3-monophosphate, 1-monoacylphosphatidylinositol-4-monophosphate and 1-monoacylphosphatidylinositol-3,4-diphosphate.

38. The method of claim 32 wherein $R_3$, $R_6$ and $R_7$ are hydrogen and at least one of $R_4$ and $R_5$ is a phosphate moiety.

39. The method of claim 38 wherein said compound is selected from the group consisting of 3-phosphoglyceroinositol-3-monophosphate, 3-phosphoglyceroinositol-4-monophosphate and 3-phosphoglyceroinositol-3,4-diphosphate.

40. The method of claim 12 wherein $R_1$ and $R_2$ are fatty acids.

41. The method of claim 12 wherein $R_1$ is a fatty acid and $R_2$ is hydrogen.

42. The method of claim 12 wherein $R_1$ and $R_2$ are hydrogen.

43. The method of claim 40 wherein $R_3$, $R_6$ and $R_7$ are hydrogen and at least one of $R_4$ and $R_5$ is a phosphate moiety.

44. The method of claim 43 wherein said compound is selected from the group consisting of diacylphosphatidylinositol-3-monophosphate, diacylphosphatidylinositol-4-monophosphate and diacylphosphatidylinositol-3,4-diphosphate.

45. The method of claim 44 wherein said compound is dipalmitoylphosphatidylinositol-3,4-diphosphate.

46. The method of claim 41 wherein $R_3$, $R_6$ and $R_7$ are hydrogen and at least one of $R_4$ and $R_5$ is a phosphate moiety.

47. The method of claim 46 wherein said compound is selected from the group consisting of 1-monoacylphosphatidylinositol-3-monophosphate, 1-monoacylphosphatidylinositol-4-monophosphate and 1-monoacylphosphatidylinositol-3,4-diphosphate.

48. The method of claim 42 wherein $R_3$, $R_6$ and $R_7$ are hydrogen and at least one of $R_4$ and $R_5$ is a phosphate moiety.

49. The method of claim 48 wherein said compound is selected from the group consisting of 3-phosphoglyceroinositol-3-monophosphate, 3-phosphoglyceroinositol-4-monophosphate and 3-phosphoglyceroinositol-3,4-diphosphate.

* * * * *

UNITED STATES PATENT AND TRADEMARK OFFICE
CERTIFICATE OF CORRECTION

PATENT NO. : 6,447,797 B2
DATED : September 10, 2002
INVENTOR(S) : Hwang et al.

It is certified that error appears in the above-identified patent and that said Letters Patent is hereby corrected as shown below:

Column 12,
Line 1, should read:
in which -- said -- compounds.

Signed and Sealed this

Twenty-ninth Day of April, 2003

JAMES E. ROGAN
*Director of the United States Patent and Trademark Office*